Nov. 29, 1966 — W. A. GRAHAM — 3,288,567

FLOATING CATALYST BED CONTACTOR

Original Filed July 28, 1961 — 2 Sheets-Sheet 1

INVENTOR.
Ward A. Graham
BY Thos. E. Scofield
ATTORNEY.

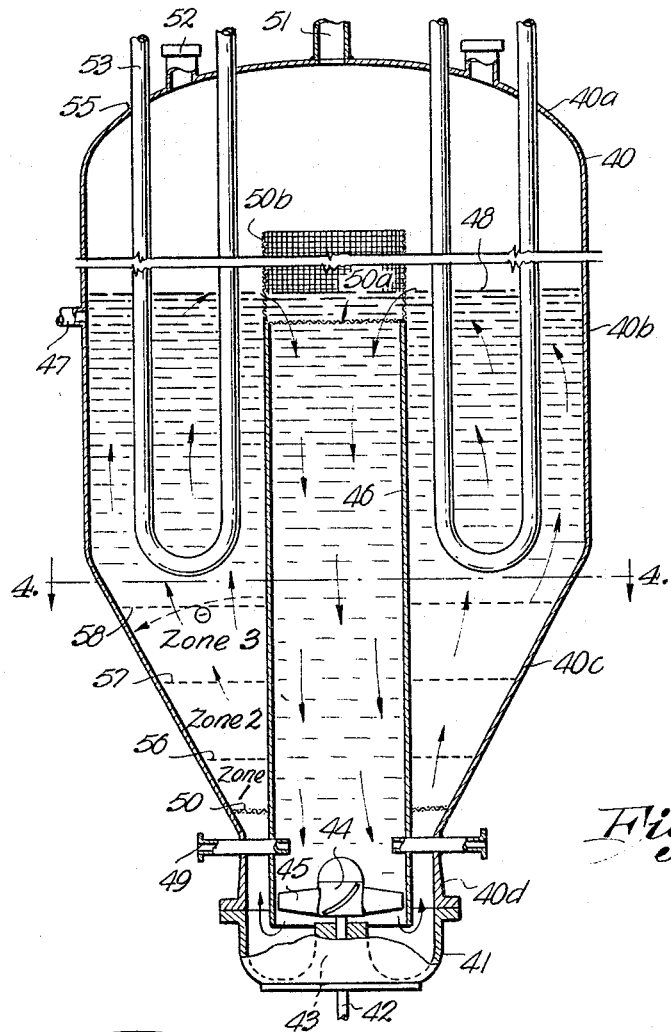
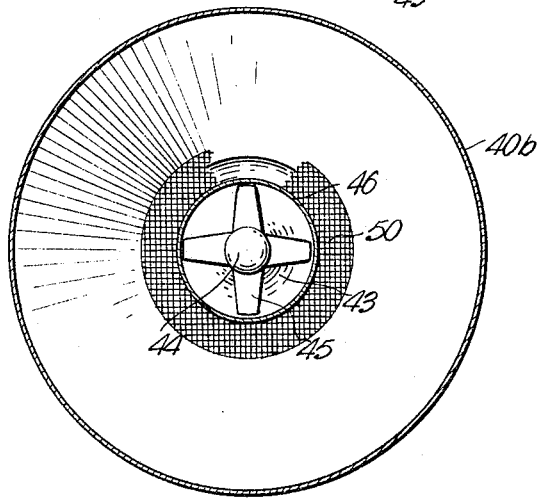

United States Patent Office 3,288,567
Patented Nov. 29, 1966

3,288,567
FLOATING CATALYST BED CONTACTOR
Ward A. Graham, Kansas City, Mo., assignor to Stratford Engineering Corporation, Kansas City, Mo., a corporation of Delaware
Continuation of application Ser. No. 127,726, July 28, 1961. This application Aug. 25, 1965, Ser. No. 486,263
4 Claims. (Cl. 23—288)

This application is a continuation of my application Serial No. 127,726, filed July 28, 1961, entitled "Floating Catalyst Bed Contactor" now abandoned.

This invention relates to methods of and apparatus for conducting solid particle catalyzed chemical reactions or reactions involving a solid particle reactant and refers more particularly to such methods and apparatus wherein the reaction takes place in a circulating volume of reaction product or reactants in a circulation vessel.

This invention is an improvement over patents to Herbert W. Stratford No. 2,909,534, issued October 20, 1959, for "Vertical Contactor with Features" and No. 2,840,355, issued June 24, 1958, for "Mixing Vessel." It is also an improvement over the invention in Patent No. 2,704,702, inventor Robert D. Pike, issued March 22, 1955, for "Method of Countercurrent In-Line Base Exchange for Removing Potassium From Wyomingite."

The use of various solid particle catalysts in accelerating or decelerating chemical reaction rates is well known in the art. The size and configuration of such solid particle catalysts vary widely, as the problem incurred in catalyzed reactions is most often that of adequate contact by the reacting materials with the catalytic surface. Powdered catalysts have been used, as have perforated cylindrical catalysts, tubular catalysts, spherical catalysts, etc. If the catalyst is powdered or finely ground, it is generally circulated with the reacting materials (the so-called "moving bed") and separated from the products of reaction by conventional means such as filtration or centrifuging at a later stage. The catalysts of larger size are generally held in a "fixed bed" and the reacting materials circulated through the bed. Reacting materials can be liquid-liquid, liquid-gas, liquid-solid, gas-gas or gas-solid systems, but must be fluid enough to be circulated by conventional means.

Problems generally associated with these catalyzed reaction systems are (1) mixing of the incoming feed materials, (2) catalytic surface contact by the reactants, (3) maintenance of constant reaction temperatures, (4) (especially) eliminating "hot spots" or localized high temperatures and (5) in the case of the "moving bed" catalysts, erosion of the surfaces exposed to the circulating catalyst.

An object of the invention is to provide a reaction chamber or vessel having a zone therein which operates to essentially "float" or "suspend" a solid particle of any practical size therein by means of fluid circulation therethrough.

Another object of the invention is to provide a circulating reaction vessel for solid catalyzed reaction systems wherein the reactants will contact catalyst surfaces each time the material flows or recirculates through a reaction chamber or zone in said vessel.

Another object of the invention is to provide a reaction chamber or zone in a circulating contacting apparatus wherein solid particles of catalyst or reactant of any practical size can be floated or suspended in the fluids circulating therethrough, heat transfer surface also being optionally provided within this mixing zone or chamber whereby to maintain necessary or desired reaction temperatures.

Another object of the invention is to provide a reaction vessel having a reaction chamber or zone therein where solid particle catalysts or reactants of any practical size can be floated or suspended therein on the circulating fluids in the vessel, means also being provided to achieve mixing of the reactants.

Another object of the invention is to provide a floating catalyst or reactant particle bed reaction vessel wherein solid catalyst or reactant particles are floated in a reaction chamber or circulated reactants and/or reaction products, the system applicable to liquid-liquid, liquid-gas, liquid-solid, gas-gas or gas-solid systems wherein the reacting materials are fluid enough to be circulated by conventional means.

Another object of the invention is to provide a floating catalyst or reactant particle bed reactor or reaction vessel wherein solid particle catalysts or reacants are suspended in a zone or chamber in the reaction vessel by circulated fluids; and wherein incoming feed materials are thoroughly mixed; effective catalytic or reactant surface contact by the reactants is achieved; constant reaction temepratures may be maintained; and hot spots or localized high temperatures eliminated.

In the drawings, which form a part of the instant specification and are to be read in conjunction therewith, embodiments of the invention are shown and, in the various views, like numerals are employed to indicate like parts.

FIG. 3 is a side-sectional view of a circulating reaction vessel of a second type wherein the catalyst suspension zone is outside of the vessel circulating tube.

FIG. 4 is a view taken along the line 4—4 of FIG. 3 in the direction of the arrows.

It is well known in the art that any particle of practical size has a terminal settling velocity in any given fluid system. If a fluid is forced vertically upwardly in a restricted space at the particle's actual settling velocity, said particle will remain suspended in the fluid. If the fluid velocity exceeds that of the settling velocity of the particle, the particle will be carried upwardly by the fluid. If the upward vertical velocity of the fluid is less than the settling velocity of the particle, the particle will settle downwardly through the fluid.

If a fluid is passed upwardly at a given volumetric flow rate through a vessel of increasing cross-sectional area, the linear velocity of the fluid will decrease as the cross-sectional area increases. For example, a flow rate of 100 gallons per minute (13.4 c.f.m.) will flow through a one square foot area at the rate of 13.4 feet per minute, but through a 10 square foot area at only 1.34 feet per minute. If, in this same example, a solid particle was introduced with a terminal settling velocity in the range of 1.34–13.4 feet per minute, the particle would remain suspended in the fluid at the point where the velocities were equal. If the terminal settling velocity was outside the range cited in this example and the liquid velocity could be altered to bracket the particle settling velocity, the particle again would remain suspended in the fluid flow zone.

It can thus be seen that, by constructing a reaction chamber with provisions for forcing fluid at a given volumetric capacity through a zone of increasing cross-sectional area, a zone can be created to essentially "float" or "suspend" a solid particle of any practical size. In the case of solid particle catalyzed reaction systems or reaction systems with a solid particle react-ant, it will also be seen that the reactants will contact catalyst or reactant surfaces each time the material flows through this zone. By providing heat transfer surface within this mixing chamber, necessary reaction temperatures can be maintained. If the fluid is moved by a pumping mechanism such as an axial-flow impeller or turbine impeller, or squirrel cage blower (for gases) the necessary mixing of the reactants can also be achieved.

The instant invention describes the means by which all of the above can be practically realized.

The zone of particle suspension can be provided by either of the designs shown in FIGS. 1 and 2 and FIGS. 3 and 4, respectively.

Figure 1:
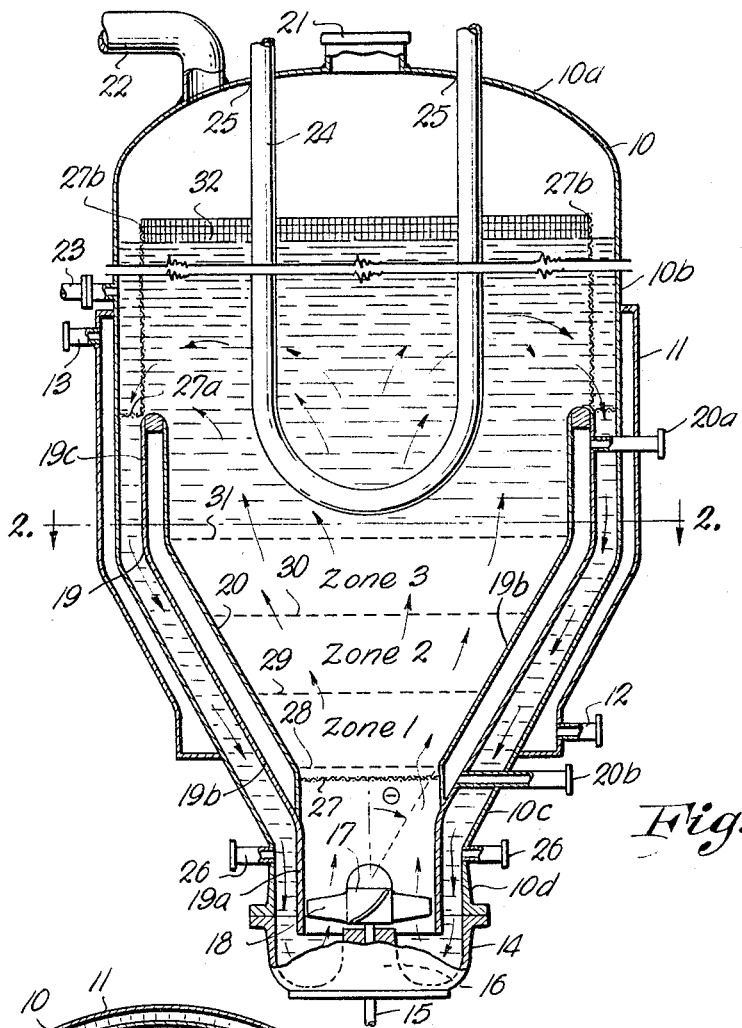
FIG. 1 is a side-sectional view through a first form of circulating reaction vessel wherein the catalyst particle suspension zone is positioned internally of the vessel circulating tube.
Figure 2:
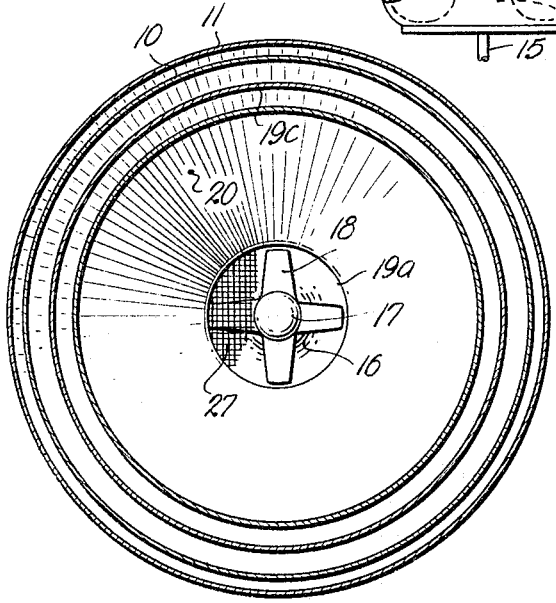
FIG. 2 is a view taken along the line 2—2 of FIG. 1 in the direction of the arrows.

Generally characterizing the construction of FIGS. 1 and 2, the fluid circulates upwardly into the interior portion of a partially conically shaped circulation tube, through the cylindrical section thereof, over the top edge thereof, then down through the annular space between the external wall of the circulation tube and the internal wall of the vessel proper, through the circulating impeller, and again upwardly through the conically shaped section of the circulating tube, etc. The angle $\theta$ of the conical section can be varied within practical limits of approximately 5° to 45°. Generally, the larger the ratio of solid particle catalysts or reactants to circulating fluid reactants, the greater the angle $\theta$ will be.

Characterizing generally the modification of FIGS. 3 and 4, in this form, the path of the fluid is reversed, flowing downwardly interiorly of the cylindrical circulation tube, through the impeller, and then upwardly through a conical section defined by the external vessel wall. The angle $\theta$ of the vessel wall provides the increasing cross-sectional flow volume variable by varying the angle $\theta$. In this zone, fluid flow can be adjusted to "suspend" any conventional solid type of particle, catalyst or reactant.

Referring to the drawings, and more particularly to FIGS. 1 and 2, outer shell 10 has thermal jacket 11 thereon with heat transfer medium inlet pipe 12 and outlet pipe 13 attached thereto. Shell 10 additionally has flow reversing hydraulic head 14 at the lower end thereof. Shell 10 further has domed upper end 10a, cylindrical vertical portion 10b and downwardly tapered conical portion 10c therebelow with short vertically oriented cylindrical portion 10d thereof positioned immediately above the connection to hydraulic head 14. Beam supports (not shown) may be attached to various portions of the outer shell to support it in its upright position. A motor (not shown) is fastened relative to the lower end of the circulating vessel by suitable members and drives shaft 15 through suitable bearing gland 16. Hub 17 of shaft 15 carries impeller or propeller blades 18. The pitch of blades 18 and the direction of rotation of shaft 15 are such that fluids below the impeller blades in the vessel are driven upwardly into the circulating tube to be described.

Circulating tube 19, having inner thermal jacket 20 thereon with input pipe 20a and output pipe 20b for heat transfer medium thereon, is positioned within the outer shell 10 and runs circumferentially therein. The lower end 19a of the circulating tube is constricted and cylindrical in form within the lesser width portion 10d of the outer shell and its lower edge penetrates the hydraulic head 14. Immediately above tube portion 19a is downwardly tapered conical tube portion 19b which is congruent in form to and runs concentrically within the tapered outer shell portion 10c. The upper end 19c of the circulating tube is again cylindrical and concentrically positioned within shell portion 10b. Jacket 20 follows the configurations of the circulating tube thereunder. The path of fluid circulated by the impeller blades 18 comprises upwardly into the circulating tube, over the upper edge thereof, down the annular space between the circulating tube and the outer shell, into the hydraulic head and then back up into the circulating tube.

Hatch 21 is positioned centrally of the top of domed portion 10a of shell 10 whereby to permit the dropping or addition of solid catalyst or solid reactant particles centrally of the circulating tube 19. Pressure release and vacuum connection pipe 22 is connected to the outer shell portion 10a in any desired portion thereof. Product withdrawal line 23 is positioned above the thermal jacket 11 and preferably adjacent the top liquid level in the vessel. Cooling coils 24 extend through opening 25 in the dome portions 10a of the outer shell and down into the cylindrical portion of the circulating tube, but preferably not into the conical portion thereof. Reactant input flowlines 26 are preferably positioned in the cylindrical portion 10b of the outer shell feeding into the annulus between the circulating tube and the outer shell. A screen mesh 27 is positioned above the impeller blades 18 and preferably very slightly below the base of conical portion 19b of the circulation tube, at least as reflected in the thermal jacket 20. A first high speed suspension zone has its upper and lower limits delineated by numerals 29 and 28, respectively, a second medium speed suspension zone thereabove (also within the conical portion of the circulating tube) has its upper and lower limits delineated by lines 30 and 29, and a third low speed suspension zone (thereabove extending to the top of the conical portion of the circulating tube) has its upper and lower limits designated 31 and 30.

A mesh 27a is preferably positioned at the top of the circulating tube whereby to close off the annulus between the circulating tube and the vessel shell, thus to prevent recirculation or circulation of the full size catalyst particles and thereby minimizing scoring of the impeller, the passage of chunks down the annulus which might be broken up into fines thereby. The provision of the meshes 27 and 27a in effect isolate the zone interiorly of the circulating tube whereby to confine the normally size catalyst particles there inside. Fines, of course, circulate through the meshes as catalyst particles break down, dissolve, are spent, etc. The fines are withdrawn through the product withdrawal line 23 and may be filtered out after removal from the vessel, if desired. It should be additionally noted that a cylindrical body of mesh 27b may be employed alone or in conjunction with the mesh 27a to prevent the circulation of full-size catalyst particles down the annulus between the circulating tube and the vessel outer shell. In case the mesh 27b is employed alone, it should extend above the liquid level in the vessel.

There are three ways to minimize the cyclic flow of catalyst particles around the annulus between the circulating tube and the vessel wall. The first of these is to provide a substantial extension of the uniform diameter portion of the circulating tube above the topmost catalyst particle control zone. In any case, the said uniform diameter portion of the circulating tube should extend upwardly far enough to avoid the existence of a dead non-circulation zone at the top of the vessel. The second method is to employ the mesh 27a, while the third method is to employ the mesh 27b. The optimum arrangement is to have an elongate uniform diameter portion of the circulating tube extending upwardly far enough to prevent any dead circulation zone at the top of the vessel, while coupled with mesh screens at 27a and 27b. Without either mesh 27a or 27b, any catalyst particle which circulates down the annulus and into the impeller is held immediately thereabove by the mesh 27, which is undesirable.

In a typical operation of the modification of FIGS. 1 and 2, the vessel is filled with the reactants or reactant and liquid catalyst up to level 32 and circulation begun with impeller 18. Once circulation is up to speed, precalculated according to the flow and weight parameters of the circulating medium and catalyst or reactant solid particles, the solid catalyst or reactant particles are dropped in through hatch 21 whereby to locate centrally of the circulating tube 19. Alternatively, the particles can be dropped onto mesh 27 prior to circulation start-up. The particles then take up an equilibrium position in one of the designated zones according to the balance between the fluid drive and the weight of the particles. As the particles are consumed, if they are such, they may shift position upwardly or downwardly, dependent upon their size/mass ratio. Mesh 27 prevents too heavy particles falling into the impeller. The cylindrical zone within tube portion 19c, above the top of zone 3 between lines 30 and 31, has, theoretically, the same flow characteristics as the zone at line 31 throughout its height. The velocity of the impeller may be increased or decreased as the particles are consumed depending upon the size/mass relationship which occurs with consumption whereby to maintain the particles within any desired control zone. The size of the angle $\theta$, the angle from vertical to the inside of the conical portion of the circulating tube, determines the relative velocity change in the given unit of height, the larger the angle the greater velocity change per unit of height. If a particle is supported originally in the low speed zone, considerable size erosion (assuming size/mass ratio constant) can occur before it falls through the high speed zone.

Referring to FIG. 3, therein is shown a modified form of circulation vessel with the fluid flow velocity control zone outside of the circulation tube. An outer shell 40 has domed portion 40a, cylindrical vertical portion 40b, lower downwardly tapered conical portion 40c, and short vertical cylindrical portion 40d therebelow. An hydraulic head 41 connects to portion 40d at the lower end thereof. A suitable power source (not shown) drives shaft 42 through bearing 43 having spinner 44 thereon carrying blades 45. The pitch of the blades is so adjusted and the direction of revolution such that circulating flow is downwardly through the vertical cylindrical circulation tube 46 into hydraulic head 41 and upwardly into shell portion 40c.

Product withdrawal line 47 is positioned above the upper end of circulating tube 46 and preferably slightly below the desired liquid full level 48 of the vessel. Input reactant flowlines 49 penetrate shell portion 40d and circulating tube 46 above impeller blades 45. Circumferential ring 50 of mesh overlies input lines 49 at the entrance to the conical tapered portion 40c of the outer shell. Dome portion 40a has pressure relief and vacuum withdrawal line 51 centrally thereof and a plurality of solid catalyst or solid reactant particle supply openings 52 therein circumferentially positioned above the annulus between the circulating tube 46 and the outer shell 40. Heat exchange coils 53 penetrate dome portion 40a of the shell through openings 54 and extend into the annular space between circulating tube 46 and outer shell 40, preferably slightly above or only very slightly into conical tapered portion 40c of outer shell 40.

A first high speed support zone is defined between mesh 50 and 56 thereabove, a second medium speed support zone between line 56 and line 57 thereabove and a third low speed support zone between line 57 and line 58 thereabove in the tapered conical portion of the outer shell 40c. The angle $\theta$ indicates the angle of inclination from vertical of the conical tapered shell wall 40c. The angle $\theta$ indicates the angle of inclination from vertical of the conical tapered shell wall 40c, the velocity change per unit height increasing with increase of said angle and decreasing with the decrease of same.

In addition to the mesh 50 at the lower portion of the particle suspension zones, a mesh 50a is preferably employed covering the top of the circulation tube 46. This mesh prevents circulation of any large catalyst particles down into the circulation tube and on to the impeller, whereby to avoid scarring of the impeller, smashing of catalyst particles of large size into fine size particles, etc. It is desirable to minimize the quantity of fine catalyst particle circulation in the reactants as any catalyst or reactant particles carried off through the withdrawal line 47 generally must be filtered out later. In addition to mesh 50a, or in substitution therefor, a cylinder of mesh 50b extending above the liquid level in the contactor may be employed. This serves the same purpose as the mesh 50a and supplements or substitutes therefor. It should be noted that any large catalyst particle which might pass down into the circulating tube 46 would be trapped by mesh 50 from moving upwardly into the catalyst particle zones again, thereby offering the difficulty of the gathering of a sump of particles in the circulation at the bottom of the contactor.

It should be noted that, in the case of the modification of FIGS. 1 and 2, a mesh could be emplaced over the upper end of the circulating tube to block off the central portion thereof. However, this is undesirable in that (1) it would not permit the insertion of heat exchanging elements 24 thereinto without special provision and (2) it would not permit the drop loading of the catalyst particle zones without special provision. Therefore, in the FIGS. 1 and 2 modification, the meshes 27a and 27b are in optimum position. Likewise, FIGS. 3 and 4, the mesh could be installed over the annulus between the circulating tube and the vessel shell. However, again, this would interfere in the insertion of heat exchanging elements and in the drop loading of the annulus zone. Therefore, the provision of either or both of meshes 50a and 50b is optimum.

As in the case of the modification of FIGS. 1 and 2, it is desirable to provide a considerable zone of uniform inner and outer diameter above the catalyst suspension zones between the circulating tube and the vessel outer shell whereby to provide a substantial settling zone for the catalyst particles. This vertical settling zone may be combined with either or both of the meshes 50a and 50b or employed alone to control the catalyst circulation. However, both the meshes and the vertical settling zone are preferred. In any case, the extension of the circulating tube 46 upwardly close to the liquid level 48 of the full vessel is desirable to provide a minimum dead zone of non-circulation at the top of the vessel.

A specific example of a typical reaction to be employed with a solid catalyst comprises the hydrogenation of vegetable oil with hydrogen gas bubbled into the circulating vegetable oil and utilizing nickel catalyst particles from .02 to .2 percent by volume of the entire circulating reaction mass.

Referring generally to the action of particles in the circulating reaction product and reactant stream, the larger particle for a given shape and density tends to ride lower in the circulating medium as it has less surface per unit of weight. Uniform erosion will result in the particles rising higher in the stream, thence passing out of the particle suspension zones as they become fines and ultimately being withdrawn in the product discharge whereby to possibly require filtration thereof from the product stream.

In operation of the modification of FIGS. 3 and 4, the vessel is filled, preferably to line 48, and circulation undertaken to achieve a desired velocity through the zones 1–3, inclusive. Once the desired circulation velocity is achieved, solid catalyst or solid reactant particles are added through openings 52 whereby to distribute in the annulus between the shell and the circulating tube 46 the desired array of solid particles. Alternatively, the particles may be dumped on the mesh prior to circulation start-up. Mesh 50 prevents excessively heavy particles from passing downwardly in the annulus between the circulating tube and portion 43 into the circulating head.

In both forms of vessel, if the size/mass ratio or the particles change with consumption or use, the impeller may be slowed or speeded to maintain the particles in the desired zone. If heat exchanging is desired, such may be accomplished through thermal coils 53. Shell 40c may be jacketed in FIG. 3 in the portion 40e interiorly thereof, in the manner of FIG. 1, if desired. Likewise, the interior or exterior portion of circulating tube 46 in FIG. 3 may be thermal jacketed as in FIG. 1.

The angle θ of the conical sections in both FIGS. 1 and 3 can be varied within practical limits of approximately 5 to 45°. Generally, the larger the ratio of catalyst/reactants, the greater the angle θ will be.

From the foregoing it will be seen that this invention is one well adapted to attain all of the ends and objects hereinabove set forth together with other advantages which are obvious and which are inherent to the structure and process.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. Apparatus for suspending material particles in substantial flow equilibrium within a circulation vessel comprising a vertically oriented liquid flow circulation vessel shell, a portion of said vertical shell thereof tapered downwardly in reducing diameter conical fashion, a vertically oriented circulating tube positioned within said vessel shell and conforming in shape thereof to that of the sides of the vessel shell immediately concentric thereto whereby to provide, interiorly thereof, in a portion of the height thereof, an inverted frusto-conical zone of upwardly increasing inner diameter, impeller means positioned in the lower end of said circulating tube operative to circulate liquid downwardly between the circulating tube and vessel shell and upwardly internally of the circulating tube, a concentric cylindrical section of tube and shell adjacent the bottom of the vessel receiving the impeller, a particle screening mesh positioned above the impeller means in the circulating tube at the bottom of said frusto-conical zone, a particle screening mesh blocking off the top of the annulus between the circulating tube and the vessel shell, said vessel liquid full in operation to a level above the top of the circulating tube.

2. Apparatus as in claim 1 including a solid particle inlet opening positioned substantially centrally of the vessel shell above the circulating tube interior, the particle screening mesh blocking off the top of the annulus between the circulating tube and the vessel shell being open in the central top portion thereof and extending above the liquid level in the vessel.

3. Apparatus for suspending material particles in substantial flow equilibrium comprising a circulation vessel having a vertically oriented shell, the lower portion of said shell tapered both inwardly and downwardly in such fashion as to provide a downwardly extending, reducing internal diameter, inverted frusto-conical portion thereof, a vertically oriented substantially cylindrical circulating tube positioned within the lower portion of said vessel shell and spaced inwardly from the walls thereof, impeller means positioned in the lower end of said circulating tube operative to cyclically circulate liquid down the inside of the circulating tube and up the annulus between the outside of the circulating tube and the inside of the lower portion of the vessel shell, a concentric cylindrical section of tube and shell adjacent the bottom portion of the vessel shell and tube receiving the impeller, a particle screening mesh positioned closely adjacent the lower end of the conical vessel shell portion between said shell and the circulating tube, a particle screening mesh blocking off the upper end of the circulating tube, the vessel liquid full in operation to a level above the top of the circulating tube.

4. Apparatus as in claim 3 including a solid particle additive opening in the vessel shell positioned above the annulus between the circulating tube and the vessel shell, the particle screening mesh blocking off the upper end of the circulating tube positioned interiorly of said annulus and extending above the liquid level in the vessel.

References Cited by the Examiner
UNITED STATES PATENTS

| | | | |
|---|---|---|---|
| 1,380,067 | 5/1921 | Koch et al. | |
| 1,404,709 | 1/1922 | Allbright | 23—285 |
| 2,078,627 | 4/1937 | Block et al. | 23—285 X |
| 2,111,727 | 3/1938 | Plews. | |
| 2,550,922 | 5/1951 | Gullette | 23—288 |
| 2,618,535 | 11/1952 | Trainer et al. | 23—288 |
| 2,838,579 | 6/1958 | Conrad et al. | |
| 2,840,355 | 6/1958 | Stratford | 259—8 |
| 2,909,534 | 10/1959 | Stratford | 23—285 |

MORRIS O. WOLK, *Primary Examiner.*

J. SCOVRONEK, *Assistant Examiner.*